US008412764B1

(12) United States Patent
Liskov et al.

(10) Patent No.: US 8,412,764 B1
(45) Date of Patent: Apr. 2, 2013

(54) METHODS AND APPARATUS FOR PROCESSING CLIENT REQUESTS IN A CONTENT DISTRIBUTION NETWORK USING CLIENT LISTS

(75) Inventors: Barbara Liskov, Waltham, MA (US); Mark Day, Milton, MA (US)

(73) Assignee: Cisco Technology, Inc., San Jose, CA (US)

(*) Notice: Subject to any disclaimer, the term of this patent is extended or adjusted under 35 U.S.C. 154(b) by 1265 days.

(21) Appl. No.: 11/645,856

(22) Filed: Dec. 27, 2006

Related U.S. Application Data

(63) Continuation of application No. 10/138,680, filed on May 3, 2002, now Pat. No. 7,260,598.

(51) Int. Cl.
  *G06F 15/16* (2006.01)
(52) U.S. Cl. .................. 709/201; 709/238; 718/105
(58) Field of Classification Search .................. 709/201, 709/238; 718/105
  See application file for complete search history.

(56) References Cited

U.S. PATENT DOCUMENTS

| | | | | |
|---|---|---|---|---|
| 5,951,651 A | * | 9/1999 | Lakshman et al. | 709/239 |
| 6,052,718 A | * | 4/2000 | Gifford | 709/219 |
| 6,266,667 B1 | * | 7/2001 | Olsson | 707/10 |
| 6,625,659 B1 | * | 9/2003 | Aramizu et al. | 709/239 |
| 6,742,047 B1 | * | 5/2004 | Tso | 709/246 |
| 6,785,704 B1 | * | 8/2004 | McCanne | 718/105 |
| 2002/0194095 A1 | * | 12/2002 | Koren | 705/35 |

* cited by examiner

*Primary Examiner* — Thuong Nguyen
(74) *Attorney, Agent, or Firm* — Hickman Palermo Truong Becker Bingham Wong LLP

(57) ABSTRACT

Mechanisms and techniques operating in a content distribution network in a peering relationship with a second content distribution network. The system maintains a first client list identifying a first set of client devices associated with a first content distribution network. The system also obtains a second client list identifying a second set of client devices associated with a second content distribution network. The system applies a client list filtering technique to the first client list and the second client list to produce a preferred client list associated with the second content distribution network. The preferred client list potentially identifies at least one preferred client device for which the second content distribution network preferably processes client requests. The system then operates a content routing technique to direct a client request associated with a client device to a content distribution network having a preferred client list that identifies the client device associated with the client request as a preferred client device.

29 Claims, 6 Drawing Sheets

METHODS AND APPARATUS FOR PROCESSING CLIENT REQUESTS IN A CONTENT DISTRIBUTION NETWORK USING CLIENT LISTS

CROSS REFERENCE TO RELATED APPLICATIONS

The present application is a continuation of U.S. application Ser. No. 10/138,680, filed on May 3, 2002 now U.S. Pat. No. 7,260,598.

BACKGROUND OF THE INVENTION

Computer networks such as the Internet allow computer systems to exchange data or content in a variety of ways. One popular technique for accessing content over a computer network such as the Internet uses a suite of protocols commonly referred to as the world wide web. In a typical operation of the world wide web, a user at a client computer system operates a software application called a web browser to access content served by a web server computer system over the computer network. The content may be any type of data or information such as documents, web pages, streams of audio or video data or the like. In particular, a user can request content from a web server by selecting or clicking a hyperlink that the web browser displays on the client computer system (e.g., within a graphical user interface). This operation causes the web browser to reference a uniform resource locator or URL which identifies, among other things, a communications protocol that the browser is to use to access the content, an network address or domain name (e.g., web site name) associated with a computer system (i.e., a web server) that the browser is to communicate with in order to retrieve the content, and the file name, path or other specific reference to the content or data itself. The web browser can use the URL information to send a content request over the network to the computer system that stores the content in order to have a computer system return the content to the web browser.

In many situations, a URL contains the domain name of the computer system that the request for content is to be directed towards rather than the actual network address (e.g., IP address) of the specific web server computer system can serve the content. As an example, a URL such as http://www.cisco.com/content.html indicates that the HTTP protocol is to be used to access content referred to as "content.html" from a computer system associated with the domain name "www.cisco.com." The name www.cisco.com is referred to as a domain name. Before a web browser can transmit a content request containing this URL to a computer system associated with the www.cisco.com domain name, the web browser must use another system called the domain name system or DNS to convert or "resolve" the domain name www.cisco.com into a network address (e.g., an IP address) of a specific computer system associated with that domain name that can receive and service the client request for the content.

To resolve a domain name into a network address, the web browser passes the domain name www.cisco.com in a domain resolution request over the network to a domain name server computer system (DNS server) associated with the client computer system (e.g., associated with the LAN or network in which the client operates). This domain name server is referred to as a client's DNS proxy server since it resolves domain names on behalf of the client. The client's DNS proxy server can consult a database of formerly resolved domain names (i.e., former conversions of domain names to network addresses done on behalf of this client or other clients) to determine if a mapping of a network address is locally available for the requested domain name to be resolved. If no network address mapping is available locally within the client's DNS proxy server, the client's DNS proxy server uses a DNS protocol to propagate the domain name resolution request over a network such as the Internet to another (one or more) DNS server that may be capable of resolving the domain name into a network address.

Eventually, a DNS server that is capable of resolving the domain name into a network address responds to the DNS request from the client's DNS proxy server and provides a DNS address resolution response that contains the requested network address of a computer system for that domain name (e.g., the network address of a computer within the www.cisco.com domain). The client's DNS proxy server then returns the requested network address back to the web browser operating within the client computer system. The web browser operating on the client computer system can receive the network address provided from that client's DNS proxy server and can use this address to provide a content request for the content associated with the hyperlink to a network device located at that network address. In other words, once the web browser obtains the network address of the web site using DNS, the web browser provides the URL to the web site in the form of a content request directed to the network address resolved by the DNS system. The computer system or other device on the network (e.g., on the Internet) that has that network address will receive the content request from the client computer system and will process the content request accordingly to return the requested content to the client.

A typical web site might have more than one web server computer system capable of providing or serving the content requested in a content request sent from a client computer system. Accordingly, a data communications device such as a load balancer on the network can be configured with the network address of the web site. Data communications devices such as routers and switches within the Internet thus route the content request to the load balancer device that is associated with (i.e., is configured with) the network address of the web site. The load balancer device can then perform a server selection operation based on the content request in order to select a specific web server computer system to handle the processing associated with the content request. The load balancer then forwards the content request to the selected web server computer system for processing. That web server can then obtain the requested content and can provide a content response containing the content over the network back to the web browser operating within the client computer system. In this manner, the web browser can present the content to the user.

In some situations however, a load balancing device for a group of web servers associated with a web site may determine that a content request received from a client is to be handled by another group of servers associated with the web site that may be located in another part of the network. As an example, perhaps load balancing issues indicate that servers associated with the load balancer at this location are heavily loaded and thus the content request should be redirected to another web server at another location. This decision might be made either by the load balancer for a group of servers or may be made by an individual web server computer system. In either case, a device can redirect a client request, such as an HTTP GET request, to another location (e.g., to an address of another load balancer for another group of servers, or to another web server computer system) by responding to the initial content request with an HTTP redirect response. The HTTP redirect response specifies an alternative URL which the web browser is to reference in order to obtain the requested content. When a web browser receives such a redirect response, it performs the processing explained above on the new URL specified within the redirect response in order to again attempt to obtain the content from another device (e.g., from another load balancer device associated with another group of servers or from another web server specifically identified within the redirect response. This may involve performing another domain name resolution for a different domain name specified in the redirect URL prior to transmitting a new content request for the redirected URL.

In this manner, one web server (or another network device such as a load balancer) can redirect content requests to other web servers (or to other network devices such as web caches). This redirection is generally transparent to the user of the web browser and can take place more than once until a particular web server receives the request and serves the requested content back to the web browser. At this point, the web browser receives the content and presents the content to the user at the client computer system.

Another conventional technology related to the present invention relates to content distribution networks. Generally, a content distribution network or CDN is a collection of computer systems (e.g., web servers and one or more load balancers) that are capable of providing content to client computer systems. The various portions of content may be related in some manner, such as being provided by a single content provider. A CDN typically includes a content router (e.g., operating as a load balancer) and one or more content engines that operate as servers (e.g., web servers) to serve content requested by content requests sent from client computer systems to the content router. The content router decides which content engine is to service particular requests for content.

As an example of the operation of a CDN, a user controlling a web browser operating on a client computer system may select a URL that references content served by a content engine within a CDN. The domain name specified in the URL might generally reference the CDN itself, such as www.CDN.com. As explained above, when the web browser uses DNS to resolve this domain name, the content router associated with the CDN can operate as a DNS server on behalf of this CDN domain. As such, when the content router receives, via the DNS system, a domain resolution request to resolve the domain name www.CDN.com into a network address, the content router can select a network address of a specific content engine within the CDN based on routing criteria such as load balancing considerations between the various content engines that might be available to service a content request for content associated with this domain. The CDN content router can return the network address of the selected content engine associated with that CDN to the web browser. As explained above, the web browser can then proceed to access the requested content from that content engine (e.g., operating as a web server) using a protocol such as HTTP.

Some content distribution networks may have large amounts of content that must be distributed for access by clients over a computer network such as the Internet. In addition, organizations that provide CDNs might have limited computing system resources available for serving such content. Accordingly, network engineers have developed systems that allow "content peering" between two or more CDNs. Generally, content peering allows two or more CDNs to share facilities (e.g., content routers and content engines) and to collectively serve the same content, referred to as peered content. In a typical peering relationship, one CDN called the primary CDN has content that its operator/owner to would like to make available to end users using content engines belonging to one or more other CDNs, called secondary CDNs. All CDNs (i.e., both primary and secondary) can benefit from this arrangement since the primary can provide a better distribution outlet for content provided by content providers (i.e., customers of the primary CDN) while the secondary CDNs can make additional content easily and quickly accessible to customers of the secondary CDN, which are the end users or subscribers at client computer systems.

Two or more CDNs in a peering relationship typically adhere to a peering policy or peering service level agreement that indicates how each CDN is to peer content. As an example, the peering agreement or relationship may indicate that either CDN (i.e., the primary or any of the secondary) can have the right to terminate the peering relationship at any time without gaining permission from the other CDNs. This termination might be complete such that the entire peering relationship ends and thus a secondary CDN need not peer content for the primary, or only certain content may no longer be peered by a secondary CDN in which case this secondary CDN can continue to peer and serve other content on behalf of the primary CDN. The peering policy can also govern such things as billing and volume tracking criteria for content, bandwidth requirements, and the like.

In a typical content peering relationship between two or more content distribution networks (e.g., a primary and one or more secondary or peering CDNs), end users of some client computer systems may be customers of the primary CDN while other users of other client computer systems may be customers of a secondary CDN that peers content on behalf of the primary CDN. Accordingly, customers of a secondary CDN ought to receive content from devices such as web servers or web caches belonging to their respective secondary CDN, while other end users operating respective client computer systems ought to receive their content from devices belonging to the primary CDN or from caches belonging to another CDN peering content on behalf of the primary CDN (i.e., in which case there are multiple secondary or peering CDN's in a peering relationship with the primary CDN).

SUMMARY OF THE INVENTION

Conventional techniques for handling content peering between primary and secondary CDNs suffer from certain deficiencies. In particular, conventional techniques for selection of a particular content distribution network (i.e., selection of a primary CDN or a secondary CDN) might fail to do in adequate job of directing a particular client to particular CDN that is most favorable for serving requested content to that client. As an example, conventional techniques for directing a client to receive content from a particular CDN (primary or secondary) might involve the primary content router in the primary CDN selecting a secondary CDN to processing client request based upon a load balancing algorithm. The primary content router may attempt to redirect or distribute client requests to multiple secondary or peering CDNs in order to balance the load across each secondary peering CDN such that one secondary is not overburdened by client requests in comparison to another secondary CDN. However, this can be problematic since this technique can result in a client computer system being directed to receive content from a secondary CDN that is not favorable to the client computer system for a number of reasons. For example, the client computer system may be geographically distant from the selected secondary CDN thus resulting in slow retrieval of content from the secondary CDN to which that client was directed by the primary CDN.

Embodiments of the present invention provide mechanisms and techniques that operate in a content routing device such as a content router or a content engine within a content distribution network, for directing client requests to an appropriate content distribution network for servicing. More specifically, embodiments of the invention provide mechanisms and techniques for selecting a particular content distribution network, from a number of content distribution networks involved in a peering relationship, to which a client request can be routed so that the client computer system can obtain requested content.

In particular, embodiments of the invention allow a content routing device such as a content router or content engine in a primary content distribution network to maintain one or more first client lists that identify first sets of client devices associated with a first or primary content distribution network. As an example, the content routing device configured according to one embodiment of the invention can maintain a first client list identifying certain client devices. One such list can be maintained for each secondary or peering content distribution network that peers content on behalf of the primary content distribution network. Generally, a first client list identifies a set of client devices that are preferably not served by the secondary content distribution network for which that first client list is maintained.

In addition, the content routing device configured according to embodiments of the invention can obtain, from a secondary or peering content distribution network, a second client list identifying a second set of client devices associated with that second content distribution network. A content routing device can access this second client list, for example, by accessing a URL associated with the second client list. Generally, the second client list identifies a set of client devices that that second content distribution network indicates are preferably served by the second content distribution network when client devices identified in the second client list request access to the content domain peered by the second content distribution network on behalf of the first or primary content distribution network.

What is meant by the term client device is an entity in a network that communicates, to a content distribution network (e.g., the primary content distribution network), a request either for content or for resolution of a domain name. For example, a client device can be a client computer system operated by an end user that submits a client request in the form of a content request from a web browser such as an HTTP GET request to retrieve specific content based on a URL, or a client request may be a domain resolution request provided to a content router by a client computer system's DNS proxy server in order to retrieve a network address of a device to which a client computer system can for a content request. Furthermore, a content routing device configured to operate according to embodiments of the invention is either a content router or a content engine within a content distribution network. Preferred embodiments of the invention operate within a content router or content engine within the primary content distribution network.

The content routing device operating according to the invention can apply a client list filtering technique to the first client list and the second client list to produce a preferred client list that is associated with the second content distribution network. The preferred client list can identify any (e.g., zero or more) potential preferred client devices for which the second content distribution network preferably processes client requests. In other words, the content routing device can perform a client list filtering technique such as a set operation (e.g., subtraction, union or intersection) in order to combine the first client list associated with the second content distribution network (but maintained by the primary content distribution network) and the second client list obtained from the second content distribution network (and maintained by the second content distribution network) resulting in the production of a preferred client list associated with that second content distribution network. This processing can be performed according to embodiments of the invention using first and second client lists respectively associated with, and obtained from, respective secondary or peering content distribution networks that peer content on behalf of the primary content distribution network. Thus, embodiments of the invention produce separate respective preferred client lists for each secondary peering content distribution network.

The content routing device can then receive a client request associated with a client device and can operate a content routing technique to direct the client request associated with the client device to a content distribution network for which a preferred client list identifies the requesting client device associated with the client request as a preferred client device. In other words, upon receipt of a client request for content from a client computer system, the content routing device can examine preferred client lists associated with secondary content distribution networks in order to determine which secondary content distribution network that client request is to be routed towards. Based upon client identities contained within the first and second client lists, as will be explained, embodiments of the invention cause client requests to be forwarded to a secondary content distribution network (or possibly the primary content distribution network) that will provide a best available service for an end user that requests the content.

A content routing device operating according to embodiments of the invention thus routes a client request for content to one of multiple secondary or peering content distribution networks that each has the requested content and for which one of such secondary content distribution networks has an associated preferred client list, calculated based on the combination of the first client list maintained for the second content distribution network and the second client list obtained from that content distribution network, that identifies the requesting client device.

More specifically, embodiments of the invention provide methods and apparatus for directing client requests to an appropriate device within a content distribution network. According to one such embodiment, a method operates in a content routing device and comprises the steps of maintaining a first client list identifying a first set of client devices associated with a first content distribution network. The method obtains a second client list identifying a second set of client devices associated with a second content distribution network. The method then applies a client list filtering technique to the first client list and the second client list to produce a preferred client list associated with the second content distribution network. The preferred client list potentially identifies at least one preferred client device for which the second content distribution network preferably processes client requests. The method then operates a content routing technique to direct a client request associated with a client device to a content distribution network having a preferred client list that identifies the client device associated with the client request as a preferred client device.

Other embodiments include a content routing device capable of comparing the preferred client list produced by the step of applying to a peering policy to determine if the second content distribution network to which the preferred client list is associated is abiding by a peering relationship defined by the peering policy with respect to client devices the preferred client list identifies as being preferably served by the second content distribution network. In other words, the client lists can be used to allow content distribution networks to check to make sure other content distribution networks with which they peer content are conforming to a pre-established peering relationship.

In one such embodiment, the content routing device operates in a primary content distribution network and obtains the second client list from a peering content distribution network that peers content on behalf of the primary content distribution network. Furthermore, the step of comparing is performed to verify that the peering content distribution network is abiding by the peering relationship defined by the peering policy between the primary and peering content distribution networks.

In an alternative embodiment, the content routing device operates in a peering content distribution network and obtains the second client list from a primary content distribution network for which the peering content distribution network peers content. In this case, the step of comparing is performed to verify that the primary content distribution network is abiding by the peering relationship defined by the peering policy between the primary and peering content distribution networks.

Other embodiments operate in a content routing device operating in a content distribution network and maintaining a client list identifying a set of client devices associated with the content distribution network and receiving, from another content distribution network, a request for the client list. In response, the content routing device transmits the client list to the other content distribution network that provided the request for the client list. In this manner, one content distribution network can provide its client list to a requesting content distribution network.

Other embodiments provide a content router and/or a content engine, each comprising at least one communications interface, a memory, a processor and an interconnection mechanism coupling the communications interface(s), the memory and the processor. In the content router, the memory is encoded with a request router application that when performed on the processor, produces a request router process that causes the content routing device to process client request as explained herein by performing the processing steps outlined above and explained in detail herein with respect to content engines and content routers.

The content router and content engine may be any type of data communications device, computerized device, or other device configured with software and/or circuitry to process and perform all of the method operations noted above and disclosed herein as embodiments of the invention. In other words, a computer, web server, switch, router, gateway, network bridge, proxy device or other network device that is programmed or otherwise configured to operate as explained herein is considered an embodiment of the invention.

Other arrangements of embodiments of the invention that are disclosed herein include software programs to perform the method embodiment steps and operations summarized above and disclosed in detail below. More particularly, a computer program product is disclosed which has a computer-readable medium including computer program logic encoded thereon that, when executed on at least one processor with a computerized device such as a content router or content engine, causes the processor to perform the operations (e.g., the methods and processing steps) indicated herein that are considered embodiments of the invention. Such embodiments of the invention are typically embodied as software, logic instructions, code and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). These software or firmware or other such configurations can be installed onto a computer system, data communications device or other dedicated or general purpose electronic device to cause such a device to perform the techniques explained herein as embodiments of the invention.

The embodiments of the invention may be implemented by computer software and/or hardware mechanisms within a data communications device or other computing apparatus. It is to be understood that the system of the invention can be embodied strictly as a software program, as software and hardware, or as hardware and/or circuitry alone. The features of the invention, as explained herein, may be employed in data communications devices and other computerized devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of embodiments of the invention, as illustrated in the accompanying drawings and figures in which like reference characters refer to the same parts throughout the different views. The drawings are not necessarily to scale, with emphasis instead being placed upon illustrating the embodiments, principles and concepts of the invention.

DETAILED DESCRIPTION OF EMBODIMENTS

Figure 1:
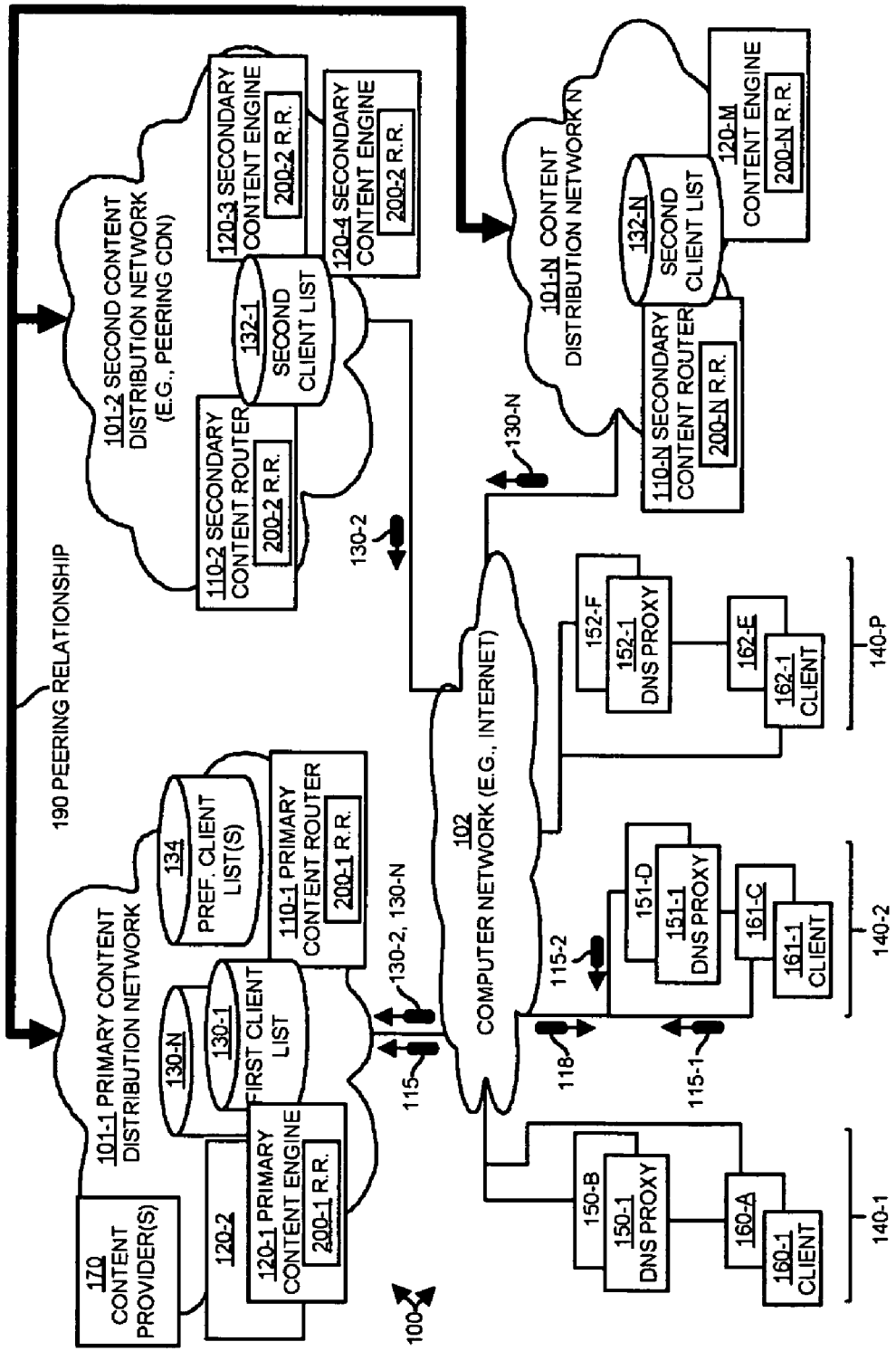
FIG. 1 illustrates an example of a networked computer environment that is suitable for use in explaining the operation of example embodiments of the invention.

Embodiments of the present invention provide mechanisms and techniques that operate in a content routing device in order to make routing and content peering decisions concerning the distribution of client requests between content distribution networks that operate in a peering relationship with each other and to confirm that a content distribution network is abiding by a content peering policy. Generally, embodiments of the invention operate as a request router application and process within a content routing device such as a content router or content engine operating in a first (e.g., primary) content distribution network that is in a peering relationship with at least one second content distribution network (e.g., peering or secondary content distribution network).

As a brief example, a request router can operate in a content router or content engine configured according to one embodiment of the invention and is capable of maintaining one or more first client lists that identify certain client devices that are preferably not served by other peering or secondary content distribution networks that are in a peering relationship with the first content distribution network. For instance, the request router operating in a content router can maintain a separate respective first client list for each second content distribution network that peers content on behalf of a first content distribution network. In addition, the request router is capable of periodically obtaining one or more second client lists from the second content distribution networks. For a particular second content distribution network, the request router combines the first client list associated with that second content distribution network and the second client list obtained from that second content distribution network in order to produce a preferred client list associated with that second content distribution network. The request router may combine the first and second client lists using a client list filtering technique such as a mathematical set operation or function such as intersection or subtraction. The resultant preferred client list identifies client devices that can submit client requests to the first content distribution network that may be routed or forwarded to the second content distribution network. Embodiments of the invention thus allow a request router operating in a content routing device to compare incoming client requests for content to preferred client lists associated with second content distribution networks that peer the requested content in order to determine or select a preferred second content distribution network to which that client request can be forwarded for processing on behalf of the client device submitting the client request.

In this manner, forwarding of client requests to specific content distribution networks as performed by embodiments of the invention happens only when that content distribution network provides "good service" on behalf of the requesting client. Good service can be defined in a service level agreement expressed by a peering relationship between primary and secondary content distribution networks.

FIG. 1 illustrates an example of a networked computing system environment 100 that is suitable for use in explaining operations of example embodiments of the invention. The computing system environment 100 includes a plurality of content distribution networks 101 that operate in a peering relationship 190 with each other. In particular, secondary content distribution networks 101-2 through 101-N peer content on behalf of a primary content distribution network 101-1. The computing system environment 100 includes groups of client devices 140-1 through 140-P. Each group of client devices 140-1 through 140-P includes one or more client computer systems 160, 161 and 162 and one or more client domain name servers 150, 151 and 152 that operate as DNS proxy servers on behalf of the client computer systems 160, 161, 162 within their respective groups 140-1 through 140-P. Some groups of client computer systems 140 might preferably obtain content from one content distribution network while other client computer systems might preferably obtain content from another content distribution network. This may be based on the geographic proximity of a client device to a particular content distribution network 101.

The primary content distribution network 101-1 includes one or more content providers 170, a plurality (two in this example) of primary content engines 120-1 and 120-2, a primary content router 110-1 and a set of first client lists 130-1 through 130-N (one or more lists) and one or more preferred client lists 134. The secondary content distribution network 101-2 includes a plurality (also two in this example) of secondary content engines 120-3 and 120-4, a secondary content router 110-2 and a respective second client list 132-1. Likewise, the other secondary content distribution networks 101-N include at least one secondary content router 110-N, one or more content engines 120-M and a respective second client list 132-N. The content routing devices (i.e., primary and secondary content routers 110 and primary and secondary content engines 120) each operate a request router 200 mechanism configured according to embodiments of this invention.

Differences in operation between a request router 200 within a primary versus a secondary or peering content distribution network and within a content router versus a content engine will be explained in different embodiments of the invention as discussed herein. Generally however, the request routers 200 perform the client list processing operations as explained herein. Prior to discussion of client list processing, a brief overview of the general operation of content distribution networks will be provided to assist the reader in understanding more detailed concepts related to the invention.

According to the general operation of the environment 100, the content providers 170 within the primary content distribution network 101-1 provide and distribute content to the various content engines 120. The content engines 120 generally operate as web server computer systems and are capable of serving content provided and distributed by the content providers 170 to clients 160 through 162 when the client computers 160 through 162 submit client content requests 115-1. The content routers 110 generally operate as domain name server (DNS) computer systems that can resolve domain name resolution requests 115-2 from client DNS proxy servers 150 through 152 into network addresses of specific content engines 120 associated with that content router's 110 content distribution network 101.

In the example illustrated in FIG. 1, the content distribution networks or CDNs 101 are in a peering relationship 190 with each other. Generally, for purposes of these example explanations, this means that content provided by the content providers 170 is distributed between the various content engines 120 in each of the CDNs 101 for serving to clients 160 through 162. The content available in this manner is referred to as a content domain or domain of content. The content domain may be an entire hosted domain (e.g., the entire contents of a web site accessible at a specific domain name) or may be portion of a domain such as individual files accessible via URLs. As a result of this peering relationship 190, all or a subset of content associated with a domain name or URLs might be obtainable by (i.e., servable from) content engines 120 in both the primary content distribution network 101-1 as well as in one or more of the secondary content distribution networks 101-1 through 101-N. The peering relationship 190 is governed by a peering policy which each of the components within each CDN 101 can access. Accordingly, a client request 115-1 for content from the client computer system 160 or a DNS proxy 150 might be re-directable, as will be explained herein, to different content engines 120 or content routers 110 within the different content distribution networks 101. For this example discussion, the primary content distribution network 101-1 serves a particular hosted domain of data or content, and all or a portion of this hosted domain content is also served by the secondary content distribution networks 101-2 through 101-N that peer the primary CDN 101-1.

It is also to be understood that the client computer systems 160 through 162 might preferably be served by some (e.g., one) content distribution networks, and might be less preferably served by other content distribution networks. As an example, one group of client computer systems 140-1 might be geographically close (i.e., in network routing terms) to the primary content distribution network 101-1 and thus these clients 160-1 through 160-S will experience greater performance when accessing content from the primary content engines 120-1 and 120-2, as opposed to attempting to access peered content from one of the secondary content distribution network 101-2 through 101-N. Likewise, other groups of client computer systems 140-2 through 140-P might be respectively preferably served by certain respective secondary content distribution networks, as opposed to attempting to access content from other content distribution networks that might be distantly located from those client groups 140. One objective of the invention is to use client list processing to direct a client computer system to the most appropriate content distribution network for access to requested content.

The illustration in FIG. 1 is provided for clarity and does not necessarily represent an actual network topology. In one implementation, a content distribution network 101 may be considered to be an "overlay network" and may have content engines physically located in multiple different networks while other content distribution networks 101 may have content engines only in a single network. In addition, it may be the case that there exist multiple content engines associated with different content distribution networks close to one client device. To this end, the illustration in FIG. 1 is provided for ease of description of the invention and does not necessarily represent an actual network layout or configuration but rather represents conceptual groupings of devices associated according to particular relationships as explained herein which are useful in explaining operations of embodiments of the invention.

Figure 2:
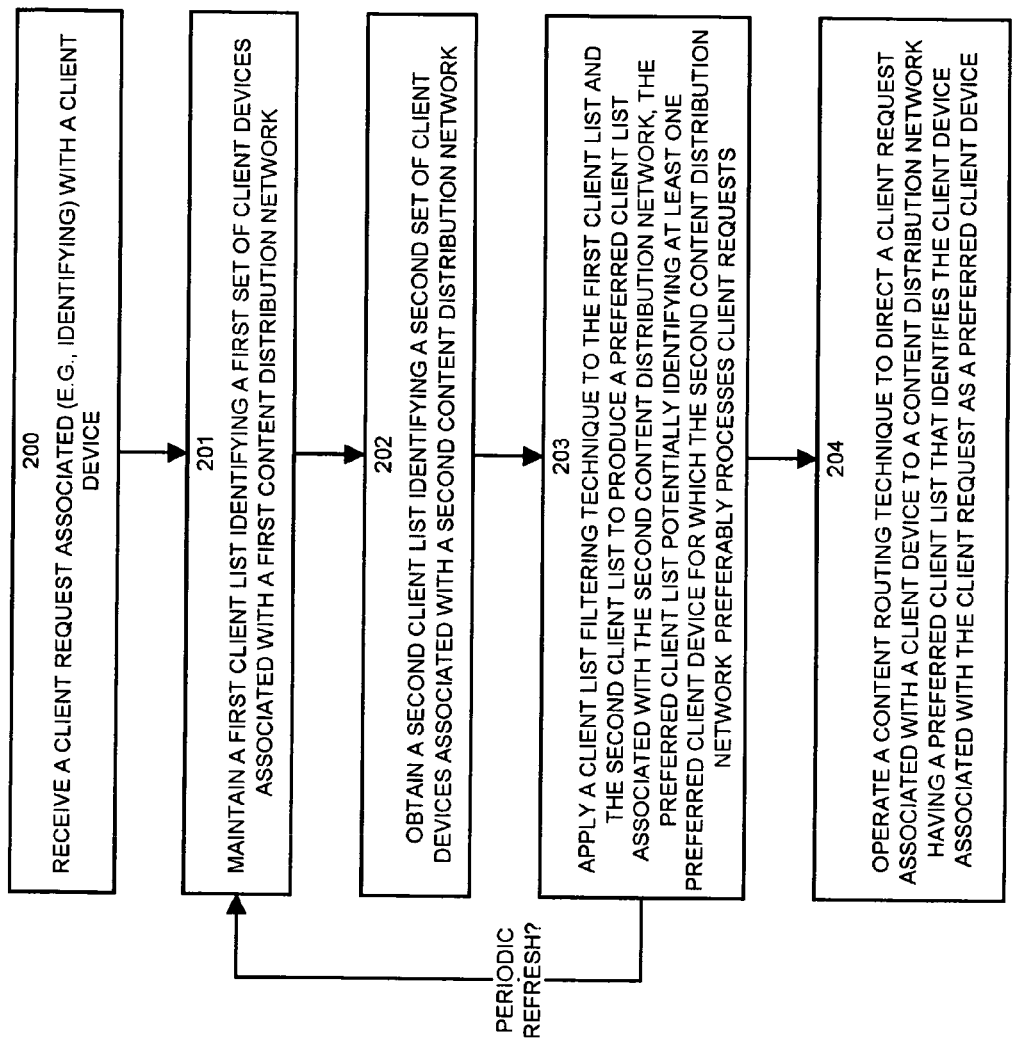
FIG. 2 is a flow chart of processing steps performed by counting routing devices configured according to one embodiment of the invention.

FIG. 2 illustrates a flow chart of processing steps performed by a request router 200 operating in a content routing device 110, 120 configured according to embodiments of the invention to process client requests using the first and second client list 130. The request router can be a software process. For purposes of this example explanation, operation of the request router 200-1 within the primary content router 110-1 in the primary content distribution network 100-1 will be explained as performing the operations shown in FIG. 2.

In step 200, the request router 200-1 receives a client request 115 associated with a client device. As an example with respect to FIG. 1, since the primary content router 110-1 operates as a domain name server for the primary content distribution network 101-1 for a hosted domain of content, the request router 200-1 might receive a client request 115-2 originating from a client DNS proxy server 151 on behalf of a client 161. The client request 115-2 in this case is a domain resolution request requesting return of a network address of a specific content engine 120 to which the client computer system 161 (respectively associated with that DNS proxy) can be directed to retrieve specific content within the domain (i.e., content associated with the domain name which is requested to be resolved). The client request 115-2 indicates the identity of the requesting client device (e.g., the network address of the DNS proxy) and in this example, also identifies the content domain for which a client computer 162 is attempting to access content.

Based on the domain name, the primary content router 110-1 can determine what other second content distribution networks 101-2 through 101-N are peering content associated with that domain name based on the peering relationship 190. In other words, the primary content distribution network 101-1 is aware, based on the peering relationship 190, of which secondary or peering content distribution networks 101-2 through 101-N peer content associated with that domain name. Assume for this example discussion of FIG. 1 that the secondary content distribution networks 101-2 through 101-N each peer content associated with (i.e., requested by) the client request 115 (received in step 200) on behalf of the primary content distribution network 101-1.

In step 201, the request router 200-1 maintains a first client list 130 (i.e., at least one) identifying a first set of client devices (e.g., the group 140-1) associated with a first content distribution network.

In one embodiment of the invention, the first client list 130 identifies the set of client devices that are preferably not served by any of the second content distribution networks 101-2 through 101-N that are in the peering relationship 190 with the first content distribution network 101-1. Depending upon the configuration, a request router 200 may maintain multiple first client lists 130-1 through 130-N. Such lists 130-1 through 130-N may be maintained on a per peered content domain basis, or on a per secondary content distribution network basis, or on a per secondary content distribution network per peered domain basis. In other words, the request router 200-1 in the primary content distribution network 101-1 might maintain one respective first client list 130-1 for each secondary content distribution network 101-2 through 101-N, or the request router 200 may maintain a separate first client list 130-1 for each second content distribution network 101-2 through 101-N for each content domain that those second content distribution networks peer on behalf of the first content distribution network 101-1 (e.g., one list per peering content distribution network per content domain).

In another embodiment, the request router 200 can maintain separate respective first client lists 130-1 through 130-N for each respective peering content distribution network 101-2 through 101-N independently (i.e., irrespective) of content domain(s) peered between the first and second content distribution networks. According to this example embodiment, it makes no difference what domains are peered between the primary and secondary content distribution networks. Instead, the request router 200 respectively maintains first client lists 130-1 through 130-N that identify sets of client devices that are preferably not served by those list's respective corresponding secondary content distribution networks 101-1 through 101-N. For this example, assume that the request routers 200 in the primary content distribution network 101-1 maintain separate respective first client lists 130-1 through 130-N for each respective secondary content distribution network 101-2 through 101-N that peers any content domain on behalf of the first or primary content distribution network 101-1.

Next, in step 202, the request router 200 obtains a second client list 132 identifying a second set of client devices associated with a second content distribution network. Referring back to the example illustrated in FIG. 1, based on the domain name of the content being requested (i.e., the domain name for which address resolution is requested), the request router 200-1 can obtain multiple second client lists 132-2 through 132-N for each secondary content distribution network 101-2 through 101-N that peers content associated with the content domain specified in the client request 115-2. The request router 200 can obtain the second client lists 132-1 through 132-N, for example, by accessing a URL associated with each second client list. Alternatively, the request router 200 configured according to embodiments of the invention can obtain the second client list 132 using another file access technique such a file transfer protocol (FTP) or via a proprietary protocol.

In step 203, the request router 200 applies a client list filtering technique to the first client list and the second client list to produce a preferred client list associated with the second content distribution network. The preferred client list potentially identifies at least one preferred client device for which the second content distribution network preferably processes client requests. Continuing with the example being discussed with respect to FIG. 1, since there are multiple secondary content distribution networks 101-2 through 101-N that peer content for the requested content domain on behalf of the primary content distribution network 101-1, in step 203, the request router 200 can apply a client list filtering technique to respective combinations of the first client list 130-1 through 130-N and second client lists 132-1 through 132-N for each secondary content distribution network 101-1 through 101-N.

In step 203 then, after obtaining a respective second client list 132 from each second content distribution network 101-2 through 101-N that peers content on behalf of the first content distribution network (i.e., step 202), the request router 200-1 applies a client list filtering technique to respective combinations of the first client list 130 and each respective second client list 132 obtained from each second content distribution network that peers content on behalf of the first content distribution network with respect to the requested domain of content (e.g., 130-1 combined with 132-1, 130-2 combined with 132-2, and so forth) in order to produce a set of preferred client lists 134-1 through 134-N. Each respective preferred client list 134 in the set is thus associated with a respective second content distribution network 101-1 through 101-N. Furthermore, each potentially identifies at least one preferred client device for which that respective second content distribution network preferably processes client requests for content peered by that second content distribution network. Note that a preferred client list might identify no client devices associated with a particular content distribution network 101. In this manner, a preferred client list 134 is produced for each secondary content distribution network that indicates (assuming the list is not empty) clients that can be served by that secondary content distribution network 101.

A request router 200 configured according to embodiments of the invention can periodically repeat steps 201 through 203 in order to periodically refresh the preferred client list 134 associated with one or more second content distribution networks to account for any changes made to the first and/or second client lists by the first and/or second content distribution networks 101. The "PERIODIC REFRESH" processing path between steps 203 and 201 in FIG. 2 illustrates this.

The specific refresh rate or frequency of calculation of preferred client lists 134 can be defined, for example, by the request router 200 itself, or can be obtained from each second content distribution network 101-2 through 101-N. As an example, during processing of step 202, the process of obtaining the second client list 132 can include obtaining a refresh rate associated with the second client list 132 from the secondary content distribution network 101 that provides that second client list 132. The request router 200 can perform calculation of a preferred client list 134 for that secondary content distribution network 101 at intervals defined by the refresh rate associated with the second client list 132. In an alternative embodiment, the request router can detect a change made to the second client list 132 associated with a second content distribution network 101-1 through 1091-N and can repeat steps 201 through 203 upon detecting the change made to the second client list 132 to pick up any changes made thereto.

In addition, according to another embodiment, when the processing of steps 201 through 203 is performed iteratively (e.g., according to a periodic refresh rate), if during the processing of step 202, the request router 200 is unable to obtain the second client list 132 from a particular second content distribution network 101-2 through 101-N, then the corresponding step 203 of applying the client list filtering technique (i.e., for that iteration of the periodic refreshing process) applies the client list filtering technique to a second client list 132 obtained during a former iteration of step 202. In this manner, if a request router 200 is unable for some reason to obtain the most recent copy of the second client list 132 from a particular secondary content distribution network 101-1 through 101-N, an older version of the second client list 132 is used.

Next, in step 204, the request router operates a content routing technique to direct the client request 115 associated with a client device (e.g., the DNS proxy in this example) to a content distribution network 101 having a preferred client list 134 that identifies the client device associated with the client request (i.e., the requesting client device) as a preferred client device. Using this technique, client requests 115 can be routed to or handled by a content distribution network that will provide preferred performance on behalf of the client device.

It is to be understood that the order of processing steps performed in FIG. 2 can be rearranged while still achieving the objectives and advantages provided according the aforementioned embodiments of the invention. For instance, it is not necessary for step 200 (receiving a client request) to be performed prior to steps 201 through 203. According to one arrangement, a request router 200 operating in the primary content distribution network 101-1 can perform step 201 through 203 on a periodic basis in order to maintain an up-to-date set of preferred client lists 134. In other words, the processing associated with maintaining first client lists 130, obtaining second client lists 132 and applying the client list filtering technique to the combinations of first and second client lists can be performed periodically such that preferred client lists 134 associated with each content distribution network that peers content on behalf of the primary content distribution network are always maintained in order to properly direct client requests to appropriate content distribution networks upon receipt of those client requests. Preferred client lists can thus be pre-calculated for later use.

As noted above, a content routing device that operates a request router 200 as explained above can be, for example, a content router in a content distribution network such as the primary content distribution network 101-1, or the content routing device can be a content engine. In embodiments where the content routing device is a content router 110 operating in the primary content distribution network, the first client list and the second client list can, for example, contain identities of client proxy devices that can submit domain resolution requests to the content router. Also in such embodiments, in step 204 of operating a content routing technique, the client device can be a client proxy device and the client request is a domain resolution request submitted to the primary content distribution network from the client proxy device in order to obtain an identity of a content engine in a content distribution network that can serve content associated with the domain of content for which the first and second content distribution networks maintain the peering relationship 190.

In other configurations, the content routing device operating according to the aforementioned steps is a content engine 120 operating in the primary content distribution network. In such cases, the first client list(s) 130 and the second client list(s) 132 contain identities of client user devices, such as client computer systems 160 through 162, that can submit content requests to the content engine operating the content router 200. In this instance, when step 204 operates a content routing technique, the client device is a client user device and the client request is a content request submitted to the content engine to obtain content associated with the domain of content for which the first and second content distribution networks maintain the peering relationship 190. Accordingly, when the content routing device is a content engine, in step 204, the content engine essentially makes a decision whether or not to serve content. If content is to be served from this content engine, then the system of the invention can "direct" the client to the same content distribution network containing the content engine by simply serving the requested content to the client device from this content engine (i.e., from the one processing step 204). That is, the content routing technique directs the client request to itself (i.e., performs no redirection) and simply serves the requested content since the content distribution network associated with this content engine is the preferred content distribution network. In such cases, the client device identity is thus present in the preferred client list for the content distribution network in which the content engine is operating (i.e., is serving content). In other cases, where the preferred client list that identifies the client device is associated with another content distribution network (other than the content distribution network in which the content engine is operating), then the content engine operates the content routing technique to "direct" the client request (e.g., via an HTTP redirect) to another content distribution network associated with the preferred client list containing the identity of the requesting client device. To this end, in step 204 as applied to a content engine, the term "direct a client request" can mean either to serve the content from content engine (i.e., thus directing the request to the content distribution network in which the content engine operates), or can mean to re-"direct" the client device to another content distribution network.

Figure 3:
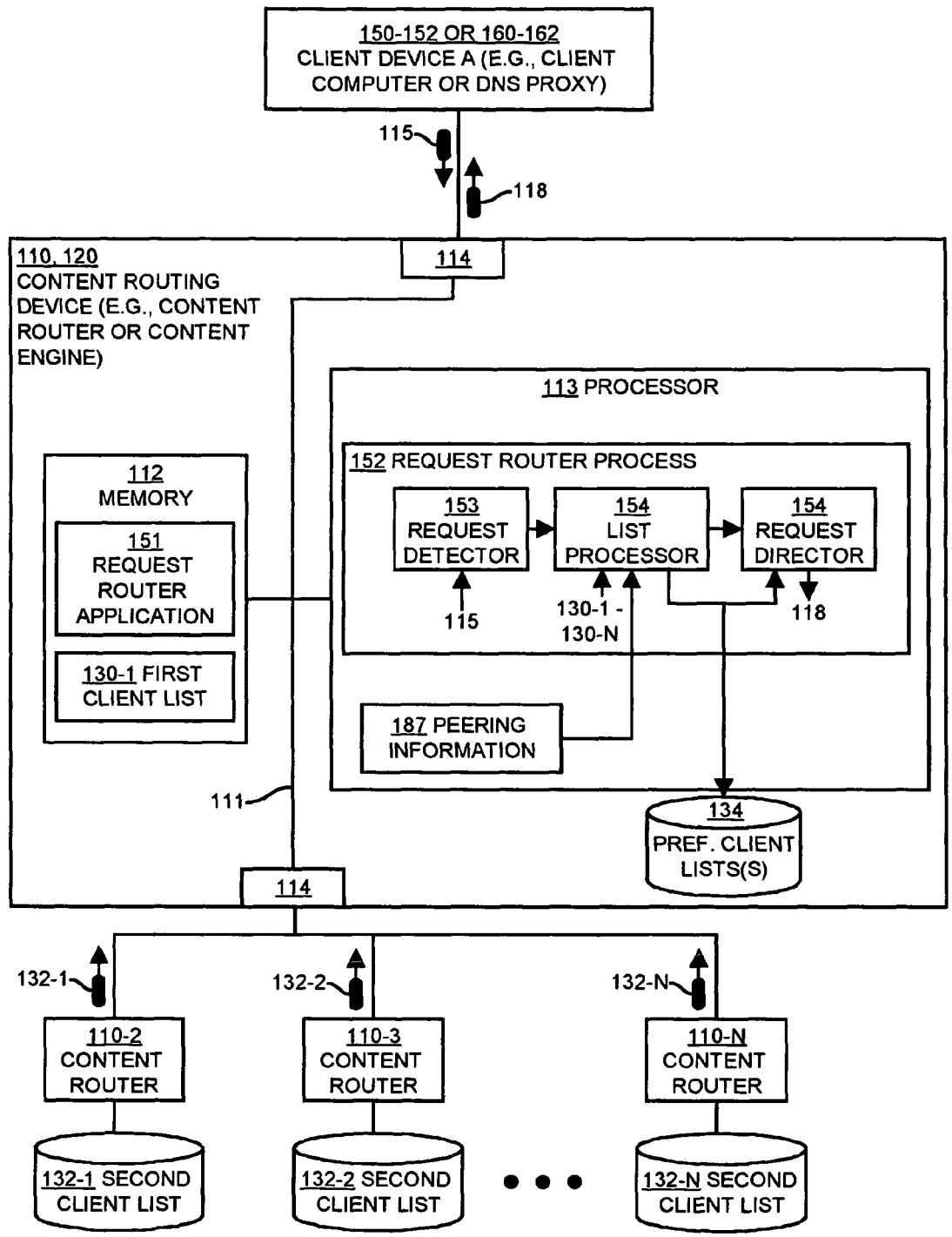
FIG. 3 illustrates an architecture of a content router and/or a content engine configured according to one embodiment of the invention.

FIG. 3 illustrates an example architecture of a content routing device (either a content router 110 and/or a content engine 120) configured according to one embodiment of the invention. In particular, the content routing device 110, 120 includes, in this example embodiment of the invention, an interconnection mechanism 111 such as a data bus and/or other circuitry that interconnects a memory 112, a processor 113 and one or more communications interfaces 114.

The memory 112 may be any type of volatile or non-volatile memory or storage system such as computer memory (e.g., random access memory (RAM), read-only memory (ROM), or other electronic memory), disk memory (e.g., hard disk, floppy disk, optical disk and so forth). The memory 112 is encoded with logic instructions (e.g., software code) and/or data that form a request router application 151 configured according to embodiments of the invention. In other words, the request router application 151 represents software code, instructions and/or data that represent or convey the processing logic steps and operations as explained herein and that reside within memory or storage or within any computer readable medium accessible to the content routing device 110, 120. In addition, in this example, the memory includes or maintains (i.e., stores) the first client list(s) 130-1 through 130-N.

The processor 113 represents any type of circuitry or processing device such as a central processing unit, controller, microprocessor, programmable gate array, application-specific integrated circuit or the like that can access the request router application 151 encoded within the memory 112 over the interconnection mechanism 111 in order to execute, run, interpret, operate or otherwise perform the request router application 151 logic instructions. Doing so forms the request router process 152. In other words, the request router process 152 represents one or more portions of the logic instructions of the request router application 151 while being executed or otherwise performed on, by, or in the processor 113 within the content routing device 110, 120. The processor also has access to peering information 187. Peering information 187 indicates what secondary content distribution networks 101-2 through 101-N are peering content on behalf of the primary content distribution network 101-1. The peering information 187 can also contain information relating to a peering policy between the primary and secondary content distribution networks and may indicate what content domains are peered between the content distribution networks.

The request router process 152 that operates in the content routers 110 and/or in the content engines 120 generally includes a request detector 153 for detecting inbound client requests, a list processor 154 for obtaining the first and second client lists 130 and 132 and producing the preferred client lists 134, and a request director for determining where (e.g., to which content distribution network) a client request 115 is to be directed. Generally, the request router process 152 is configured to operate according to the techniques explained above. The list processor 154 can consult the peering information 187 to determine a peering policy and to determine which secondary content distribution networks peer content on behalf of the primary content distribution network. This information can be used to determine which second client lists 132 are to be obtained from which secondary content distribution networks 101-1 through 101-N and can also be used to determine which first client lists 130-1 through 130-N are to be maintained and combined with the second client lists 132 during processing of the steps explained above with respect to FIG. 2.

Figure 4:
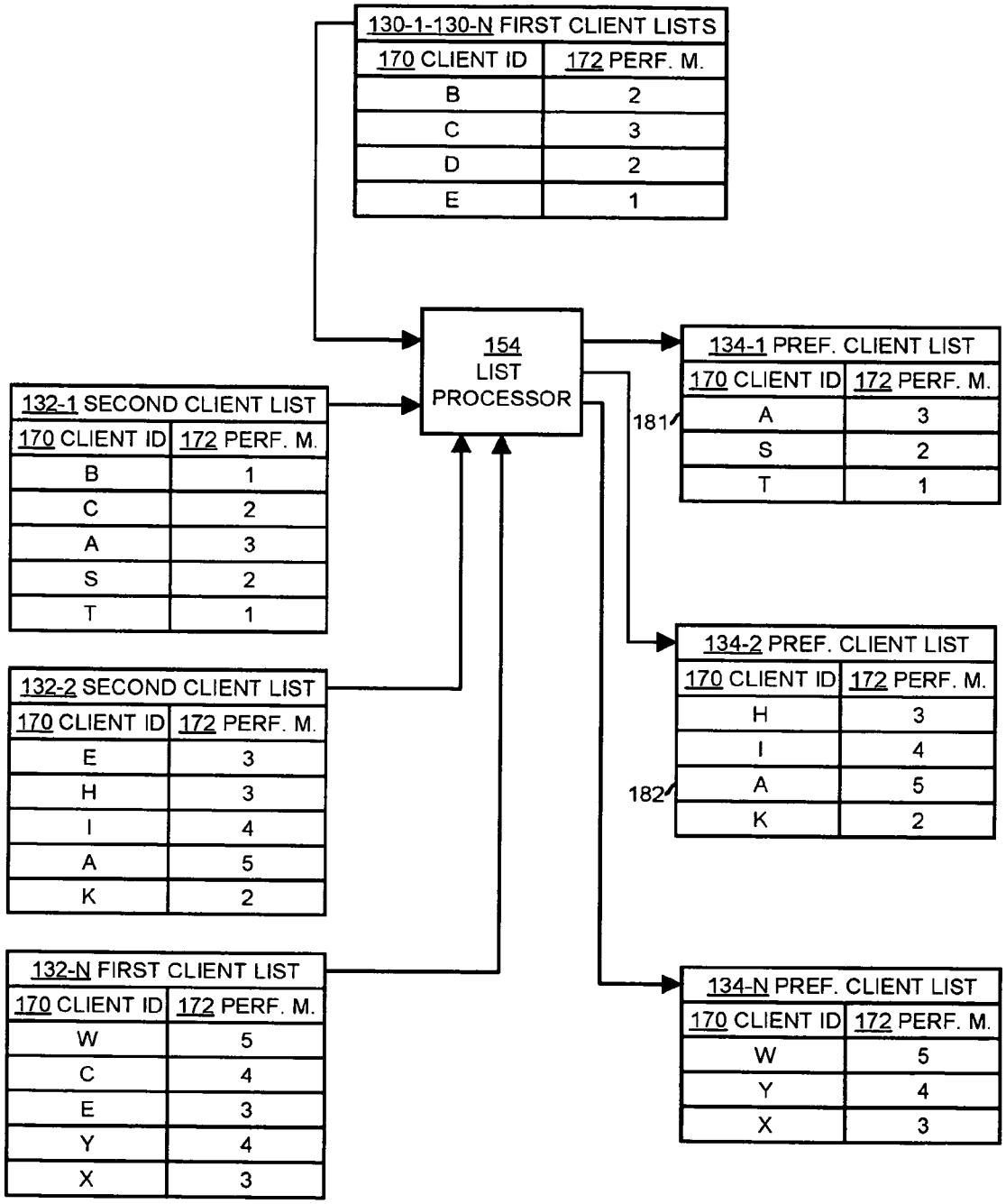
FIG. 4 illustrates an example of how a request router configured with a list processor can process first and second client lists to produce preferred client lists according to one example embodiment of the invention.

FIG. 4 illustrates an example of client list processing as performed by a request router 150 configured according to one example embodiment of the invention to produce a set of preferred client lists 134. In this example, the list processor 154 receives as input N second client lists 132-1 through 132-N and also receives N first client lists 130-1 through 130-N. The first client lists 130-1 through 130-N are maintained by the request router(s) 200 in the first content distribution network, whereas the second client lists 132-1 through 132-N are maintained by respective second content distribution networks 101-2 through 101-N.

Each client list 130 and 132 identifies particular client devices based on client identity 170 and also identifies, for each client device identity 170, a respective associated performance metric 172 for that client identity 170. Note that in this example, the client identities 170 are represented by letters (i.e., A, B, C, etc.) and that performance metrics are represented by numbers (e.g., 1, 2, 3, etc.) for ease of description of this example. In an actual implementation, client identities 170 can be network addresses such as IP addresses of client devices and performance metrics 172 can be access times, bandwidth ratings, round trip transmit times, or any other metric that indicates how well (e.g., how fast) a particular client device (e.g., a DNS proxy server or a client computer system) can access content from a particular content distribution network 101 that maintains that client list 130, 132. In other words, performance metrics 172 indicated for respective client device 170 in the first client lists 130-1 through 130-N are relative to accessing data by those clients from the first or primary content distribution network 101-1, whereas performance metrics 172 for clients device 170 in each second client list 132-1 through 132-N represent performance ratings for each client to access data from the respective content distribution network that maintains that second client list 132.

As an example, the client device having identity B is contained in the set of first client lists 130-1 through 130-N and has an associated performance metric of 2 with respect to accessing content from the primary content distribution network 101-1, since this content distribution network 101-1 maintains the first client lists 130-1 through 130-N (i.e., the performance metrics 172 in the first client lists 130 are measured with respect to the first content distribution network 101-1). The same client device B is also listed in the second client list 132-1 as having an associated performance metric of 1 when accessing content from the second client list 132-2, since the secondary content distribution network 101-2 maintains this second client list 132-1 (and provides this list as explained above to the request router for list processing purposes). If a higher performance metric 172 indicates worse performance (e.g., indicates longer access times required to obtain content from a particular content distribution network), then it can be inferred that client device B obtains better performance when obtaining content from the first content distribution network 101-1 (associated with the first client list 130) as opposed to that same client device B obtaining content from the secondary content distribution network 101-2 associated with the second client list 132-1.

Note that in this example, the contents of each second client list 132-1 through 132-N varies, while the contents of each first client list 130-1 through 130-N is the same. This is done by way of example only for ease of description of this example operation of the invention. It is to be understood that each first client list 130-1 through 130-N may contain, in other configurations, different client identities 170. That is to say, since each first client list 130-1 through 130-N in this is example is maintained by request router(s) 200 operating in the first or primary content distribution network 101-1, each indicates performance metrics 172 relative to that first content distribution network 101-1. However, during list combination processing (as explained generally in step 203, and as will be explained in other embodiments shortly), each first client list 130-1 through 130-N corresponds to a secondary content distribution network 101-2 through 101-N so that the request router 200 can combine first and second clients lists 130, 132 for the same secondary content distribution network 101 using the client list filtering technique to produce a corresponding preferred client list 134 for that second content distribution network 101.

As illustrated in FIG. 4, the list process 154 applies (step 203 in FIG. 2) a client list filtering technique to respective combinations of first and second client lists 130, 132 to produce a set of preferred client lists 140-1 through 140-N. Each preferred client list 140 corresponds to a respective secondary content distribution network 101-2 through 101-N that peers content on behalf of the primary content distribution network 101-1.

Depending upon the embodiment of the invention in operation, during operation of the list processor 154, it applies a client filter function such as, for example, an intersection function, a union function, or a subtraction function to each combination of the first client list 130-1 through 130-N and each respective second client list 132-1 through 130-N to produce the respective preferred client list 134 for the second content distribution network from which the second client list 132 (used in the combination) was obtained. The particular filtering technique used can be pre-configured or preprogrammed into the list processor 154, or may be defined, for example, in the peering information 187 defined by a content peering agreement between the primary and secondary content distribution networks 101.

Alternatively, when the list processor 154 obtains a second client list 132 from a respective second content distribution network, the list processor 154 can also obtain a respective client filter function definition associated with the respective second content distribution network 101 from which the second client list 132 is obtained. In other words, in one embodiment of the invention, each secondary or peering content distribution network can specify a particular list filtering technique to use when combining the first and second client lists 130 and 132. Such a function can be agreed upon as part of the peering relationship 190. In such cases, the list processor 154 applies the client filter function associated with the second client list to a combination of the first client list and the second client list associated with the second content distribution network from which the second client list is obtained.

Figure 5:
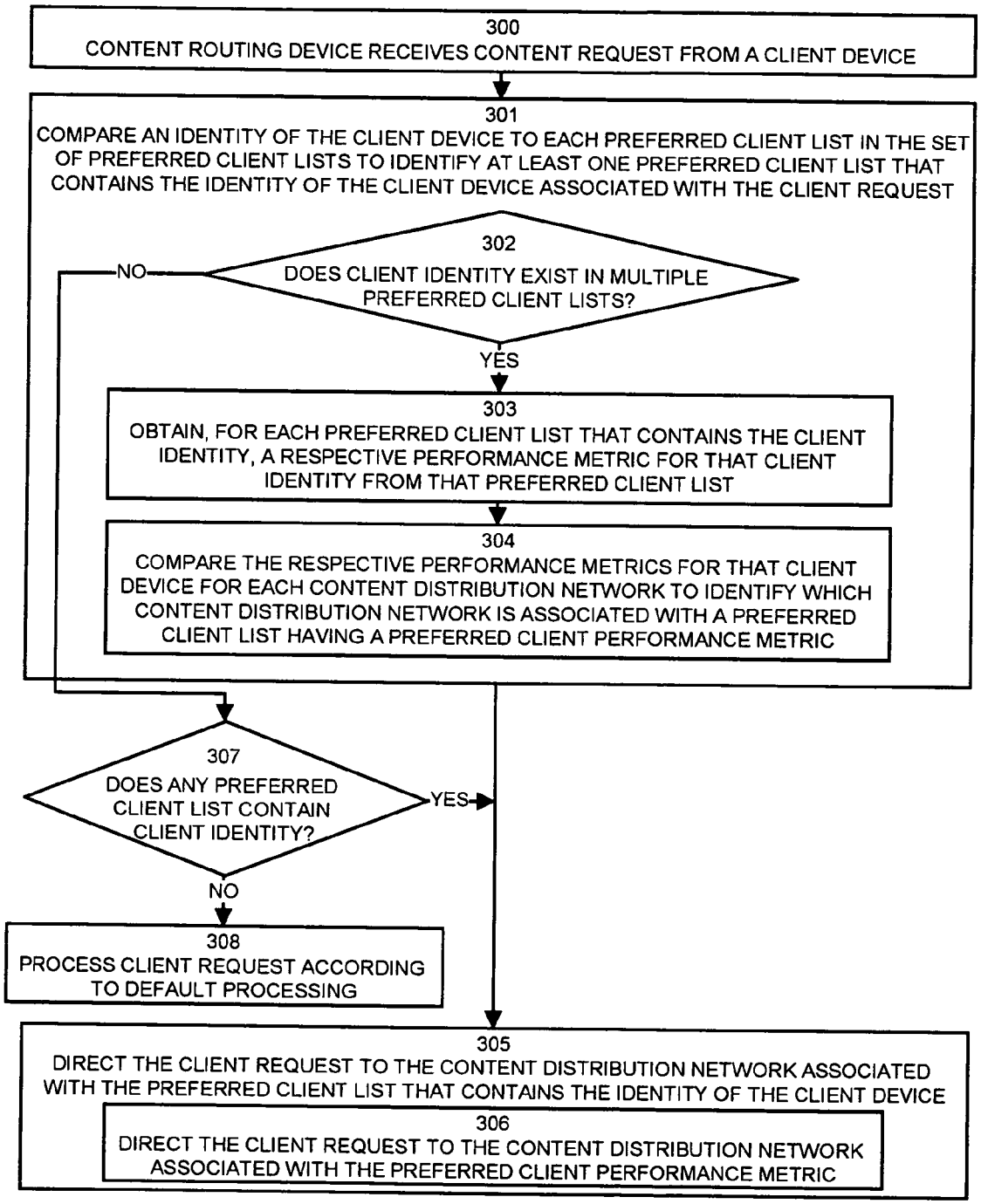
FIG. 5 is a flow chart of processing steps performed by a content routing device to route client requests between content distribution networks in accordance with one example embodiment of the invention.

FIG. 5 provides a flow chart of processing steps that describe a technique for processing client requests 115 in a request router 200 operating from within a content routing device configured according to embodiments the invention. These steps will be explained with reference to the aforementioned Figures.

In step 300, the client routing device operating a request router 200 receives a client request 115 from a client device. As illustrated in FIG. 1, the client request 115 may be a content request 115-1 from a client computer system 160 through 162 or may be a domain name resolution request 115-2 received from a client's DNS proxy server 150 through 152.

In step 301, the request router 200 compares an identity of the requesting client device (obtained from the client request 115) to each preferred client list 134-1 through 134-N in the set of preferred client lists 134 to identify at least one preferred client list 134 that contains the identity of the client device associated with a client request 115. Details of the processing of step 301 as performed according to one embodiment the invention are shown in steps 302 through 304.

In step 302, the request router 200 determines if the client identity exists in multiple preferred client lists 134. In other words, in step 302, the request router 200 determines if more than one preferred client list 134 contains a client identity 170 that matches the identity of the client submitting the client request 115. If more than one preferred client list 134 includes a client identity 170 that matches the client identity of the client device submitting the client request 115, processing proceeds to step 303.

In step 303, the request router 200 obtains, for each preferred client list 134 that contains the matching client identity, a respective performance metric 172 for that client identity 170 from that preferred client list 134. In other words, for each preferred client list 134 that has a client device identity 170 that matches the identity of the client device submitting the client request 115, the request router process 152 obtains a corresponding performance metric 172 for that client device entry in the preferred client list 134.

Next, in step 304, the request router 200 compares the respective performance metrics for that client device for each content distribution network (i.e., from each preferred client list 132) to identify which content distribution network 101 is associated with the preferred client list 134 having a preferred client performance metric 172 associated with that client identity 170. Stated differently, in step 304, the request router 200 decides which content distribution network will serve content to a client computer system 160 through 162 based upon which of the multiple preferred client lists 134 contain the best performance metric 172 for the client identity 170 that matches the client device (i.e., the identity of either the client DNS proxy device 150 through 152 or the identity of a client computer system 160 through 162) that submitted the client request 115. After step 304 is complete, processing proceeds to step 305.

In step 305, the request router directs the client request 115 to the content distribution network 101 associated with the preferred client list 154 that contains the identity of the client device providing the client request 115 (i.e., the content distribution network selected in step 301). That is, in step 305, the request router sends the client request to a destination selected or identified in step 301 (and in sub-steps 303 and 304 if performance metrics are used). If multiple preferred client lists 134 contain the client identity (and thus steps 303 and 304 are used to identify a proper content distribution network), then step 306 is used to direct the request to the selected appropriate content distribution network 101 (i.e., as specifically identified in step 304 above). In other words, step 306 is a sub-step or operation within the processing of step 305 that is used for those embodiments that use performance metrics associated with client identities (i.e., when two or more preferred client lists contain the identity of the requesting client device).

It is to be understood that, as explained above with respect to step 204 in FIG. 2, if the content routing device is a content engine, the process of "directing" a client request in step 305 (and possibly 306) might entail processing this request locally within this content engine in order to serve content back to the requesting client device (i.e., if the content distribution network identified in step 301 for the selected preferred client list is the same content distribution network for which this content engine can serve the requested content). Alternatively, a content engine performing the processing of steps 305/306 in FIG. 5 may "direct" a client request to another content distribution network, for example, via an HTTP redirect.

In step 306, the request router directs the client request to the content distribution network 101 associated with the preferred client list 134 containing the preferred client performance metric 172 for that client identity 170 that matches the client identity of the client providing the client request 115.

Returning attention to step 302, if the client identity of the requesting client device does not exist as a client identity 170 in multiple preferred client lists 134, processing proceeds to step 307.

In step 307, the request router 200 determines if the client identity does not exist in any of the preferred client lists 134. If this is the case, processing proceeds to step 308 at which point the request router performs default processing of the client request 115.

As an example of default processing in step 308, if the client identity of the client device submitting the client request 115 appears in no preferred client lists 134, then the client device may be a new client device requesting content from the primary content distribution network 101-1 for the first time. In such cases, default processing might include attempting to obtain or determine a performance metric for that client device from each content distribution network 101. This may involve signaling each content distribution network to ping or otherwise contact the client device to determine which content distribution network is the optimum content distribution network from which the requesting client should obtain content. Then, the request router can direct the client computer system from the optimum content distribution network.

Alternatively, default processing of a client request 115 from a client device that does not appear in any preferred client lists 134 might involve directing the client device to retrieve content from the primary content distribution network 101. Alternatively, default processing may involve some other processing to determine which content distribution network 101 might most preferably serve that client device using a technique other than client list processing. Once this is determined, the request router 200 can cause the preferred content distribution network to add that client identity to the second client list 132 (or first client list 130 in the case where the primary is the more preferred content distribution network) associated with the most preferred content distribution network 101.

Since embodiments of the invention allow the request router 200 to obtain second client lists 132 from secondary content distribution networks, embodiments of the invention provide autonomy to the first and second content distribution networks. As an example, in FIG. 4, the second client list 132-1 indicates that client A has a performance metric 172 of 3. In addition, the second client list 132-2 indicates that client A has a performance metric 172 of 5. Thus, both content distribution networks associated with the second client lists 132-1 and 132-2 each advertise that they can serve content on behalf of client A, but the performance metric of one is different than another.

Embodiments of the invention as explained above allow such autonomy and provide a way to determine which content distribution network client A should be directed to in order to obtain content. Furthermore, embodiments of the invention provide autonomy between the primary content distribution network 101-1 and each secondary or peering content distribution network 101-2 through 101-N.

Figure 6:
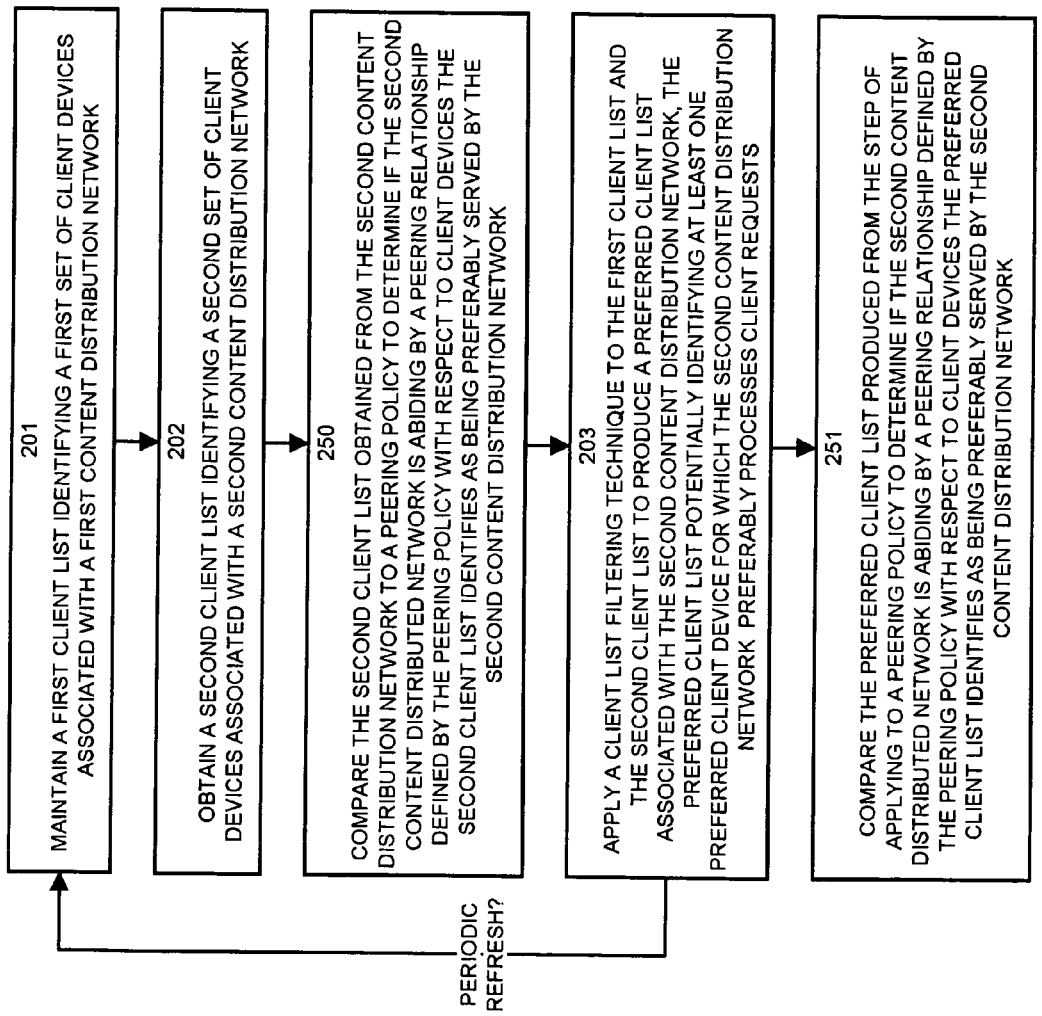
FIG. 6 is a flow chart of processing steps performed by a content routing device to check if a content distribution network is abiding by a peering policy.

FIG. 6 is a flow chart of processing steps performed by embodiments of the invention to determine, based on the contents of client lists 130, 132, if a content distribution network is abiding by a peering policy (e.g., defined within the peering information 187) that defines the peering relationship 190. Step 201 and 202 are performed just as explained above with respect to FIG. 2 in order to maintain a first client list 130 and obtain one or more second client lists 132. After obtaining a second client list 132, processing proceeds to step 250.

In step 250, the request router compares the second client list obtained from the second content distribution network to a peering policy (e.g., contained within the peering information 187) to determine if the second content distribution network is abiding by the peering relationship defined by the peering policy with respect to client devices the second client list 132 identifies as being preferably served by the second content distribution network. As an example, suppose the peering policy or agreement between the primary content distribution network 101-1 and a secondary content distribution network 101-2 specifies that the secondary content distribution network 101-2 is to accept client requests 115 for a certain number of client devices. By being able to obtain the second client list 132-1 for that secondary content distribution network 101-2, the primary content distribution network can confirm that the secondary content distribution network 101-2 is abiding by the peering relationship 190.

Next, the request router 200 performs step 203 as previously described to generate the preferred client lists 134 associated with the second content distribution network from which the second client list 132 was obtained.

In step 251, the request router then compares the preferred client list 134 (produced by the step of applying) to a peering policy to determine if the second content distribution network to which the preferred client list is associated is abiding by a peering relationship defined by the peering policy with respect to client devices the preferred client list identifies as being preferably served by the second content distribution network. In other words, the first client list 130-N can be combined with the second client list 132-N obtained from the second content distribution network 101-N in order to limit or mask those client devices that the first content distribution network 101-1 considers should not be served by the second content distribution network 101-N. In this manner, by adjusting the content of the first client list 130-N, the primary content distribution network can control the amount of client devices served by the second content distribution network 101-N.

In one embodiment of the invention, the content routing device operates in primary content distribution network and obtains the second client list from a peering content distribution network that peers content on behalf of the primary content distribution network. In such a configuration, the steps of comparing 250, 251 are performed to verify that the peering content distribution network is abiding by the peering relationship defined by the peering policy between the primary and peering content distribution networks.

In another embodiment, the content routing device operates in a peering content distribution network and obtains the second client list from a primary content distribution network for which the peering content distribution network peers content. In this configuration, the steps of comparing 250, 251 are performed to verify that the primary content distribution network is abiding by the peering relationship defined by the peering policy between the primary and peering content distribution networks. In other words, both the primary and secondary content distribution networks can use the client lists to determine if each is abiding by the peering policy.

Those skilled in the art will understand that there can be many variations made to the embodiments explained above while still achieving the same objective of those embodiments and the invention in general. As an example, rearrangement of the processing steps in the flow charts may be performed by those skilled in the art while still achieving the objectives of embodiments of the invention as explained herein. Such variations are intended to be covered by the scope of this invention. As such, the foregoing description of embodiments of the invention is not intended to be limiting. Rather, any limitations to the invention are presented in the following claims.

What is claimed is:

1. A method, comprising:
    maintaining a first client list identifying a first set of client devices associated with a first content distribution network;
    obtaining a second client list identifying a second set of client devices associated with a second content distribution network;
    producing, from elements of the first client list and the second client list, a preferred client list identifying preferred client devices for which the second content distribution network processes client requests;
    routing a client request associated with a client device to one of, the first content distribution network and the second content distribution network based, at least in part, on the preferred client list; and
    periodically refreshing the preferred client list by selectively obtaining the second client list and filtering the first client list and the second client list to reproduce the preferred client list.

2. The method of claim 1,
    the first content distribution network is a primary content distribution network and the second content distribution network is a peering content distribution network that is in a peering relationship with the first content distribution network for at least one content domain; and
    the second client list identifies a set of client devices that the second content distribution network prefers to serve when client devices in the second client list request access to the at least one content domain.

3. The method of claim 2, where the first client list identifies a set of client devices that are preferably not served by the second content distribution network.

4. The method of claim 2, where there are a plurality of second content distribution networks that are in at least one peering relationship with the primary content distribution network, and
    maintaining separate first client lists for respective peering content distribution networks of the plurality of second content distribution networks that are in the at least one peering relationship with the first content distribution network.

5. The method of claim 4, where maintaining separate first client lists for respective peering content distribution networks preserves the separate first client lists independently of the at least one content domain peered between the first content distribution network and the second content distribution network.

6. The method of claim 1,
    where obtaining the second diem list comprises obtaining a refresh rate associated with the second client list; and
    where periodically refreshing is performed at intervals defined by the refresh rate associated with the second client list.

7. The method of claim 1,
    where selectively obtaining the second client list includes,
    detecting a change made to the second diem list associated with the second content distribution network; and
    obtaining the second client list when a change is detected in the second client list.

8. The method of claim 7, where, upon determining that obtaining the second client list has failed, the method includes using a previously obtained second client list to filter the first client list and the second client list.

9. The method of claim 1, where
    the first client list is published on a URL accessible to the second content distribution network, and
    the second client list is published on a URL accessible to the first content distribution network.

10. The method of claim 1, where producing the preferred client list includes:
    performing a set operation to produce the preferred client list, the set operation comprising one of, a subtraction operation, a union operation, and an intersection operation.

11. A content routing device, comprising:
    a memory;
    a processor;
    a communications interface;

an interconnection mechanism coupling the memory, the processor and the communications interface; and a request router configured to cause the processor to perform:

maintaining a first client list identifying a first set of client devices associated with a first content distribution network;

obtaining a second client list identifying a second set of client devices associated with a second content distribution network;

producing, from elements of the first client list and the second client list, a preferred client list identifying preferred client devices for which the second content distribution network processes client requests; and routing a client request associated with a client device to one of, the first content distribution network and the second content distribution network based, at least in part, on the preferred client list; and periodically refreshing the preferred client list by selectively obtaining the second client list and filtering the first client list and the second client list to reproduce the preferred client list.

12. The content routing device of claim 11, where the first content distribution network is a primary content distribution network and the second content distribution network is a peering content distribution network that is in a peering relationship with the first content distribution network for at least one content domain;

the second client list identifies a set of client devices that the second content distribution network prefers to serve when client devices in the second client list request access to the at least one content domain.

13. The content routing device of claim 12, where the first client list identifies a set of client devices that are preferably not served by the second content distribution network.

14. The content routing device of claim 13, where the request router causes maintaining a first client list by causing the processor to perform:

maintaining separate first client lists for respective content domains peered between the first content distribution network and other content distribution networks.

15. The content routing device of claim 12, where the primary content distribution network is in at least one peering relationship with a plurality of second content distribution networks, and where the request router is further configured to cause the processor to perform: maintaining separate first client lists for respective peering content distribution networks of the plurality of second content distribution networks that are in the at least one peering relationship with the first content distribution network.

16. The content routing device of claim 15, where the request router is further configured to cause the processor to maintain separate first client lists for respective peering content distribution networks by preserving the separate respective first client lists independently of the at least one content domain peered between the first content distribution network and the second content distribution network.

17. The content routing device of claim 11, where the request router is further configured to cause the processor to perform:

obtaining a refresh rate associated with the second client list; and periodically refreshing the second client list at intervals defined by the refresh rate associated with the second client list.

18. The content routing device claim 11, where the request router is further configured to cause the processor to selectively obtain the second client list by:

detecting a change made to the second client list associated with the second content distribution network; and obtaining the second client list when a changed is detected in the second client list.

19. The content routing device of claim 18, where, upon the processor determining that obtaining the second client list has failed, the request router causes the processor to use a previously obtained second client list to filter the first client list and the second client list.

20. A non-transitory computer-readable storage medium, storing one or more instructions which, when executed by one or more processors, cause the one or more processors to perform:

maintaining a first client list identifying a first set of client devices associated with a first content distribution network;

obtaining a second client list identifying a second set of client devices associated with a second content distribution network;

producing, from elements of the first client list and the second client list, a preferred client list identifying preferred client devices for which the second content distribution network processes client requests;

routing a client request associated with a client device to one of, the first content distribution network and the second content distribution network based, at least in part, on the preferred client list; and periodically refreshing the preferred client list by selectively obtaining the second client list and filtering the first client list and the second client list to reproduce the preferred client list.

21. The non-transitory computer-readable storage medium of claim 20, where the first content distribution network is a primary content distribution network and the second content distribution network is a peering content distribution network that is in a peering relationship with the first content distribution network for at least one content domain; and the second client list identifies a set of client devices that the second content distribution network prefers to serve when client devices in the second client list request access to the at least one content domain.

22. The non-transitory computer-readable storage medium of claim 21, where the first client list identifies a set of client devices that are preferably not served by the second content distribution network.

23. The non-transitory computer-readable storage medium of claim 21, where the primary content distribution network peers with at least one of a plurality of second content distribution networks, and where the storage medium further comprises instructions which, when executed, cause the processors to perform: maintaining separate first client lists for respective peering content distribution networks of the plurality of second content distribution networks that are in the at least one peering relationship with the first content distribution network.

24. The non-transitory computer-readable storage medium of claim 23, where the instructions for maintaining separate first client lists for respective peering content distribution networks further comprise instructions which, when executed, cause the processors to perform: preserving the separate first client lists independently of the at least one content domain peered between the first content distribution network and the second content distribution network.

25. The non-transitory computer-readable storage medium of claim 20, where the instructions that cause obtaining the second client list further comprise instructions which, when executed, cause obtaining a refresh rate associated with the second client list; and where periodically refreshing is performed at intervals defined by the refresh rate associated with the second client list.

26. The non-transitory computer-readable storage medium of claim 20, where the instructions that cause selectively obtaining the second client list further comprise instructions which, when executed, cause the processors to perform:

detecting a change made to the second client list associated with the second content distribution network; and obtaining the second client list when a change is detected in the second client list.

27. The non-transitory computer-readable storage medium of claim 26, further comprising instructions which, when executed, cause the processors to perform upon determining that obtaining the second client list has failed, using a previously obtained second client list to filter the first client list and the second client list.

28. The non-transitory computer-readable storage medium of claim 20, where the first client list is published on a URL accessible to the second content distribution network, and the second client list is published on a URL accessible to the first content distribution network.

29. The non-transitory computer-readable storage medium of claim 20, where the instructions that cause producing the preferred client list further comprise instructions which, when executed, cause the processors to perform:

performing a set operation to produce the preferred client list, the set operation comprising one of, a subtraction operation, a union operation, and an intersection operation.

* * * * *